(12) United States Patent
Hirao et al.

(10) Patent No.: US 11,913,397 B2
(45) Date of Patent: Feb. 27, 2024

(54) ENGINE

(71) Applicant: Yanmar Holdings Co., Ltd., Osaka (JP)

(72) Inventors: Yu Hirao, Osaka (JP); Yuki Kobayashi, Osaka (JP)

(73) Assignee: YANMAR HOLDINGS CO., LTD., Osaka (JP)

( * ) Notice: Subject to any disclaimer, the term of this patent is extended or adjusted under 35 U.S.C. 154(b) by 0 days.

(21) Appl. No.: 18/119,618

(22) Filed: Mar. 9, 2023

(65) Prior Publication Data

US 2023/0287842 A1    Sep. 14, 2023

(30) Foreign Application Priority Data

Mar. 10, 2022    (JP) .................. 2022-036956

(51) Int. Cl.
| | |
|---|---|
| *F02D 41/04* | (2006.01) |
| *B63H 21/36* | (2006.01) |
| *B63H 21/38* | (2006.01) |
| *F01P 11/16* | (2006.01) |
| *F02C 7/32* | (2006.01) |
| *F02D 11/02* | (2006.01) |
| *F02D 11/10* | (2006.01) |

(52) U.S. Cl.
CPC .......... *F02D 41/042* (2013.01); *B63H 21/36* (2013.01); *F01P 11/16* (2013.01); *F02C 7/32* (2013.01); *F02D 11/02* (2013.01); *F02D 11/107* (2013.01); *B63H 21/383* (2013.01); *F01P 2050/06* (2013.01)

(58) Field of Classification Search
CPC ...... F02D 41/042; F02D 11/02; F02D 11/107; B63H 21/36; B63H 21/383; F01P 11/16; F01P 2050/06; F02C 7/32
USPC ........................................... 701/112
See application file for complete search history.

(56) References Cited

U.S. PATENT DOCUMENTS

2016/0281600 A1*  9/2016  Nakanishi ............... F02B 77/11

FOREIGN PATENT DOCUMENTS

| CN | 101353082 B | * | 6/2010 | |
|---|---|---|---|---|
| JP | 2016-186243 A | | 10/2016 | |
| WO | WO-2015145801 A1 | * | 10/2015 | ......... B60R 16/0215 |

OTHER PUBLICATIONS

WO2015145801A1 (Terumitsu, T) (Oct. 10, 2015) (Machine Translation) (Year: 2015).*

* cited by examiner

*Primary Examiner* — Mahmoud Gimie
(74) *Attorney, Agent, or Firm* — NORTON ROSE FULBRIGHT US LLP

(57) ABSTRACT

An engine includes an engine stop switch for stopping the engine, and a cooling part included in a holding portion or passage of a cooling liquid. The engine stop switch is placed at the cooling part or at a peripheral part of the cooling part.

18 Claims, 6 Drawing Sheets

ENGINE

CROSS-REFERENCE TO RELATED APPLICATIONS

This application claims priority under 35 U.S.C. § 119 to JP Application No. 2022-036956 filed Mar. 10, 2022, the entire contents of which are hereby incorporated by reference.

TECHNICAL FIELD

The present invention relates to an engine.

BACKGROUND ART

Conventionally, it is known to provide an engine with an emergency stop switch that immediately stops the engine in an emergency (see, for example, Patent Document 1).

In a marine engine disclosed in Patent Document 1, a space portion penetrating in the up and down direction is formed at a top cover provided on an upper face of the engine, and an engine-side operating unit including an emergency stop switch is placed in the space portion. The upper end of the engine-side operating unit is placed in a position lower than the upper face of the top cover. This allows for an easy access to the emergency stop switch from above the engine, and prevents the emergency stop switch from being accidentally stepped on at the time of a maintenance, etc. of the engine.

PRIOR ART DOCUMENT

Patent Document

Patent Document 1: Japanese Unexamined Patent Application Publication No. 2016-186243

SUMMARY OF INVENTION

Technical Problem

By the way, it is important to know where to place the emergency stop switch. For example, a configuration in which the emergency stop switch is placed in the space portion formed at the top cover may not necessarily have a good operability. Further, there is a concern that the emergency stop switch, if being placed in a place prone to high a temperature, may deteriorate.

An object of the present invention is to improve an engine provided with an engine stop switch.

Solution to Problem

An exemplary engine according to the present invention includes: an engine stop switch for stopping the engine; and a cooling part included in a holding portion or passage of a cooling liquid, wherein the engine stop switch is placed at the cooling part or at a peripheral part of the cooling part.

Advantageous Effects of Invention

The present invention which is exemplary can improve an engine provided with an engine stop switch.

DESCRIPTION OF EMBODIMENTS

Figure 1:
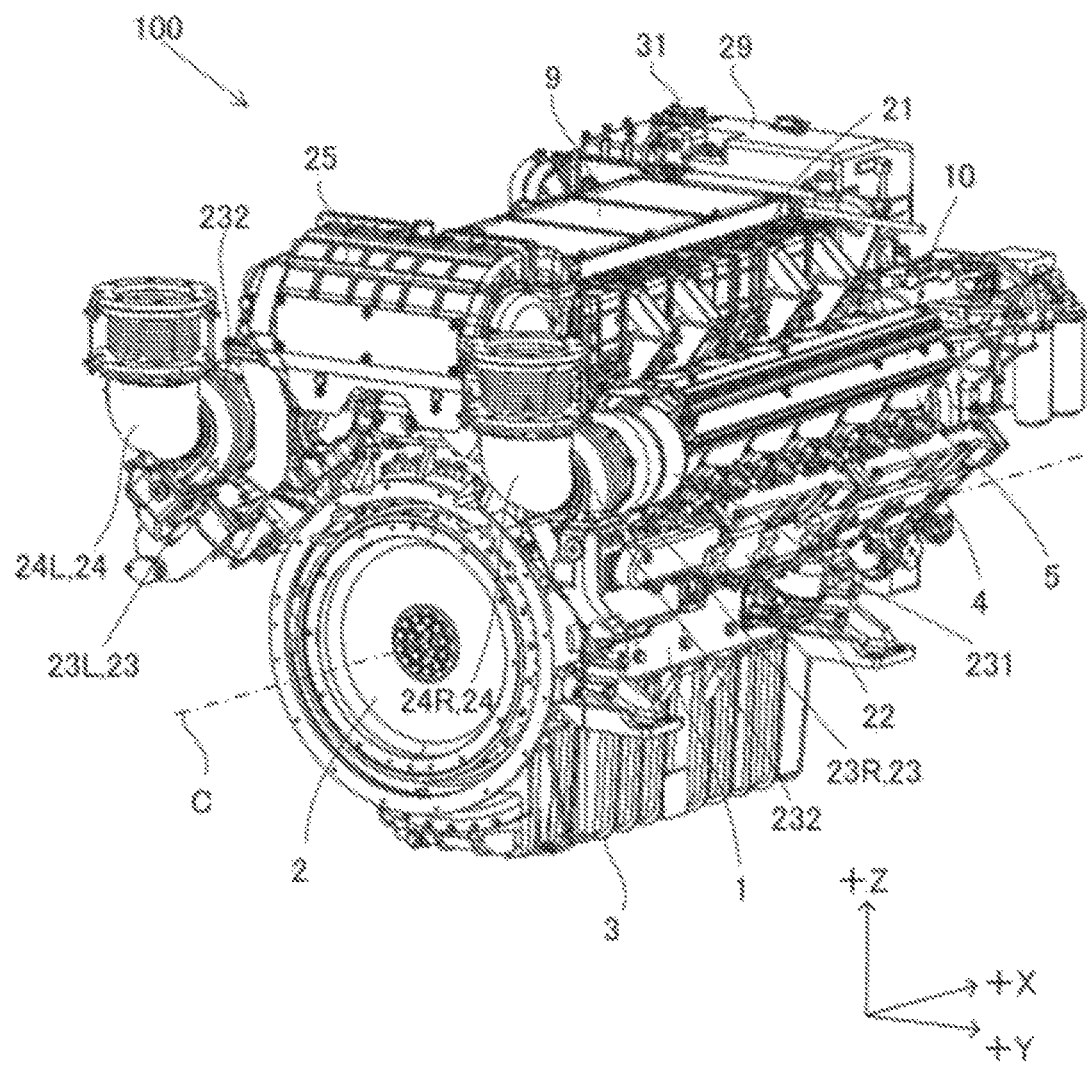
FIG. 1 is a schematic perspective view showing a configuration of an engine.

The following is a detailed description of an exemplary embodiment of the present invention with reference to the drawings. In the drawings, XYZ coordinate system is shown as the 3D Cartesian coordinate system, as appropriate. In the following description, X direction is defined as a front and back direction, Y direction is defined as a right and left direction, and Z direction is defined as an up and down direction. +X side is defined as a front side, and −X side is defined as a back side. +Y side is defined as a right side, and −Y side is defined as the left side. +Z side is defined as an upper side, and −Z side is defined as a lower side. In detail, the direction in which a center line C of a crankshaft (output shaft) shown in FIG. 1 extends is defined as the front and back direction, and the side where a flywheel 2 is placed relative to a cylinder block 1 is defined as the back side. The up and down direction is defined with the side, where an oil pan 3 is placed relative to the cylinder block 1, as the lower side. The direction orthogonal to the front and back and up and down directions is defined as the right and left direction, with the right side being the right side and the left side being the left side when viewed from the back toward the front. These directions are names merely used for an illustrative purpose, and are not intended to limit the actual positional relation and direction.

<1. Overview of Engine>

FIG. 1 is a schematic perspective view showing a configuration of an engine 100 according to an embodiment of the present invention. The engine 100 is preferable, for example, as a marine engine used for a ship. However, the engine 100 is not limited to the marine engine, and may be applied to any other application. The engine 100 is a diesel engine.

Figure 2:
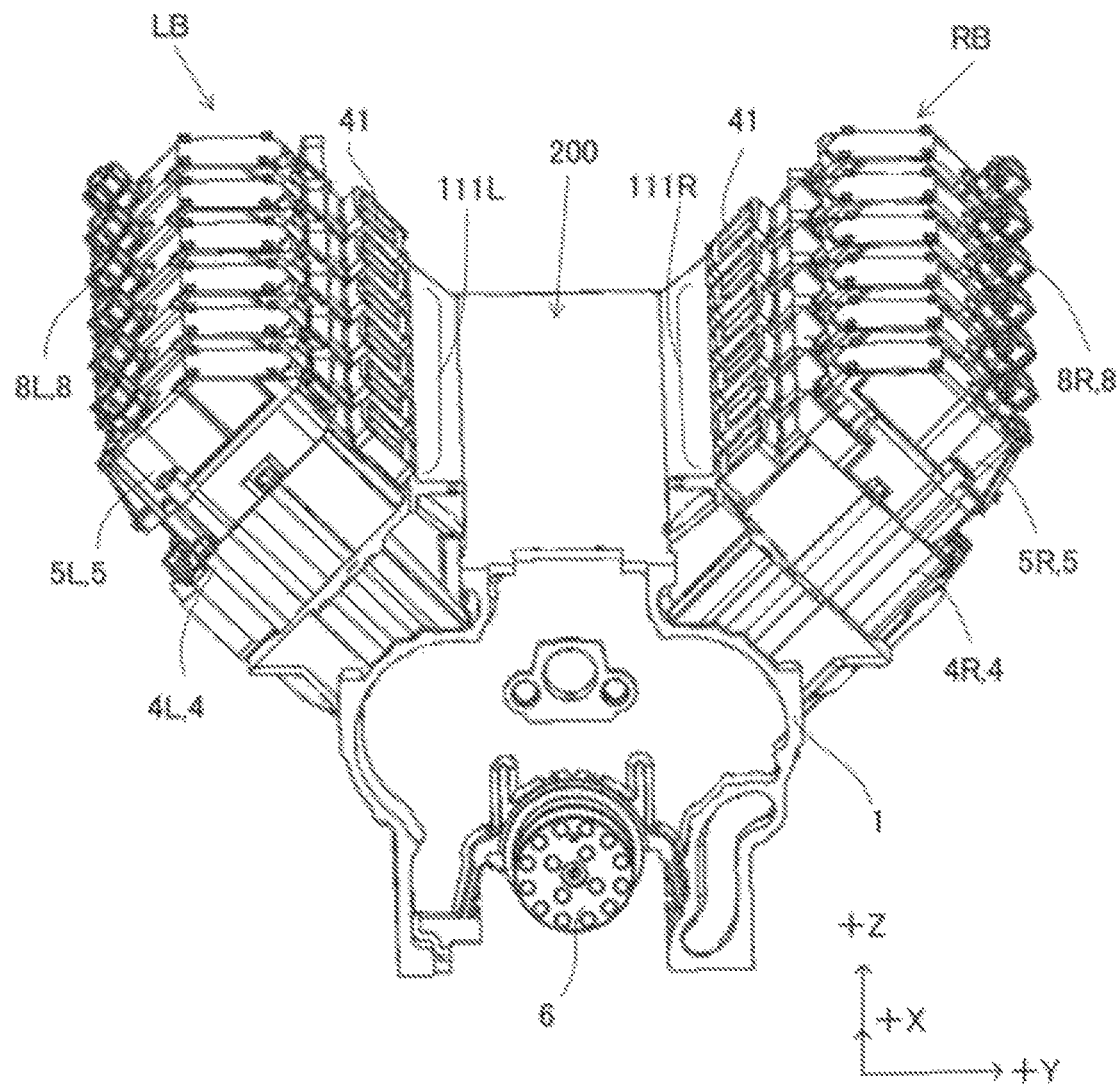
FIG. 2 is a schematic perspective view extracting and showing a portion including a cylinder block, a head block, and a head cover which are provided in the engine.
Figure 3:
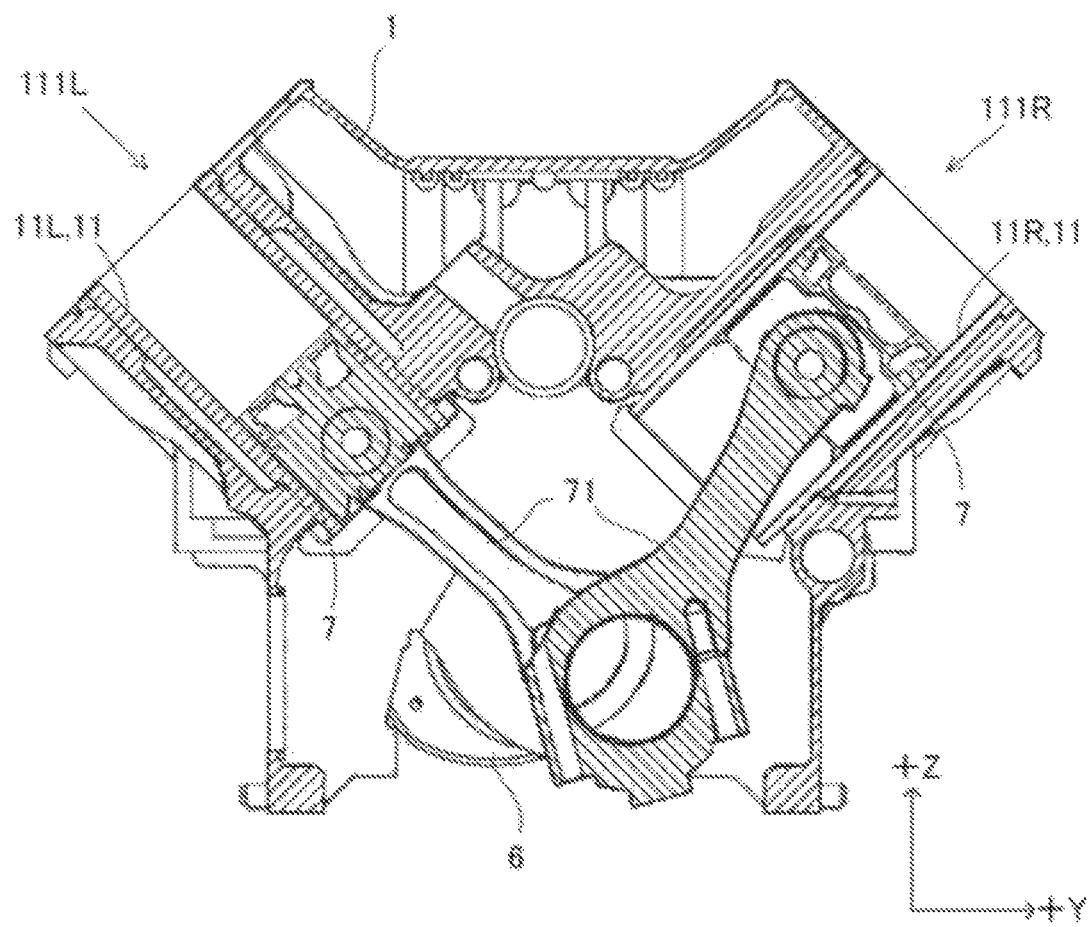
FIG. 3 is a schematic cross-sectional view of a cylinder block portion provided in the engine.

As shown in FIG. 1, the engine 100 includes a cylinder block 1, a head block 4, and a head cover 5. FIG. 2 is a schematic perspective view extracting and showing a portion including the cylinder block 1, the head block 4, and the head cover 5 which are provided in the engine 100. FIG. 3 shows a schematic cross-sectional view of the cylinder block 1 portion of the engine 100.

As shown in FIGS. 2 and 3, a crankshaft 6 and a piston 7 which extend in the front and back direction are placed inside the cylinder block 1. The interior of the cylinder block 1 connects to the interior of the oil pan 3 which is placed at the lower side and stores a lubricant oil. A flywheel 2 (see FIG. 1) is mounted to the back end of the crankshaft 6. The flywheel 2 rotates integrally with the crankshaft 6, and is used to take out power from the engine 100. The piston 7, in detail, is placed in the cylinder 11 formed in the cylinder block 1. The piston 7 is connected to the crankshaft 6 via a connecting rod 71.

In detail, the cylinder block 1 has a right cylinder 11R placed on the right side and a left cylinder 11L placed on the left side. The right cylinder 11R, when viewed from behind, is of a cylindrical shape which is tilted to the right relative to the up and down direction and extends in an oblique direction. The left cylinder 11L, when viewed from behind, is of a cylindrical shape which is tilted to the left relative to the up and down direction and extends in an oblique direction. The right cylinder 11R and the left cylinder 11L are placed in a V-shape. The pairwise right cylinder 11R and left cylinder 11L which are placed in the V-shape are placed with their cylinder axes slightly offset in the front and back direction. In the present embodiment, the left cylinder 11L is placed slightly forward of the right cylinder 11R.

The cylinder block 1 has a right cylinder row 111R with the plural right cylinders 11R arranged in the front and back direction, and a left cylinder row 111L with the plural left cylinders 11L arranged in the front and back direction. That is, the engine 100 has a first cylinder row 111R and a second cylinder row 111L. The right cylinder row 111R and the left cylinder row 111L form a V-shaped bank. In the present embodiment, the number of right cylinders 11R included in the right cylinder row 111R and the number of left cylinders 11L included in the left cylinder row 111L are each six, as an example. That is, the engine 100 in the present embodiment is a V-type 12-cylinder engine.

In each of the right and left cylinder rows 111R and 111L, the head block 4 is placed overlapping each cylinder 11. The head block 4 is fastened to the cylinder block 1 by using a screw. In detail, the head block 4 includes a right head block 4R that overlaps the right cylinder 11R and a left head block 4L that overlaps the left cylinder 11L. Because one right head block 4R overlaps each right cylinder 11R, there are as many right head blocks 4R as there are right cylinders 11R. Because one left head block 4L is overlaps each left cylinder 11L, there are as many left head blocks 4L as there are left cylinders 11L. In the present embodiment, the number of right head blocks 4R and the number of left head blocks 4L are each six.

Each of the head blocks 4 has an intake port 41 to supply gas to a combustion chamber including the cylinder 11, the piston 7, and the head block 4, and an exhaust port (not shown) to exhaust the gas from the combustion chamber. The exhaust port is provided on the opposite face of the face where the intake port 41 is provided. In detail, the right head block 4R has the intake port 41 on the left lateral face and the exhaust port on the right lateral face. The left head block 4L has the intake port 41 on the right lateral face and the exhaust port on the left lateral face.

Each head block 4 is covered with the head cover 5. The head cover is fastened to head block 4 by using a screw. Each head cover 5 covers intake and exhaust valves (not shown) placed at the head block 4. An injector 8 is mounted on each head cover 5. The injector 8's one end portion, where an injection port for injecting a fuel is placed, faces the combustion chamber. The injector 8's another end portion projects outward from the head cover 5.

In detail, the head cover 5 includes a right head cover 5R that covers the right head block 4R and a left head cover 5L that covers the left head block 4L. The right head covers 5R, due to covering the respective right head blocks 4R, are the same in number as the right head blocks 4R. The left head covers 5L, due to covering the respective left head blocks 4L, are the same in number as the left head blocks 4L. In the present embodiment, the number of right head cover 5R and left head cover 5L are each six. Also, the number of right injectors 8R placed at the right head cover 5R and the number of left injectors 8L placed at the left head cover 5L are each six.

On the right side of cylinder block 1, the right cylinder 11R, the right head block 4R and the right head cover 5R, which are included in a right bank RB, extend diagonally upward to the right. On the left side of cylinder block 1, the left cylinder 11L, the left head block 4L, and the left head cover 5L, which are included in a left bank LB, extend diagonally upward to the left. In plan view from the front and back direction, a combination of the right bank RB and the left bank LB is V-shaped, and the engine 100 has a V-bank. An intra-bank area 200 is formed between the right bank RB and the left bank LB in the right and left direction.

Returning to FIG. 1, the engine 100 has an upper face cover 9 and a lateral face cover 10. The upper face cover 9 prevents water from splashing, due to condensation, for example, onto a controller 26 (see FIG. 4, etc., below) and the like placed inside. The lateral face cover 10 prevents the fuel from splashing due to a crack, etc. in a component part such as the head block 4, for example. Although FIG. 1 shows only the lateral face cover 10 placed on the right lateral face, a similar lateral face cover 10 is also placed on the left lateral face. That is, the engine 100 is equipped with a pair of right and left lateral face covers 10.

Figure 4:
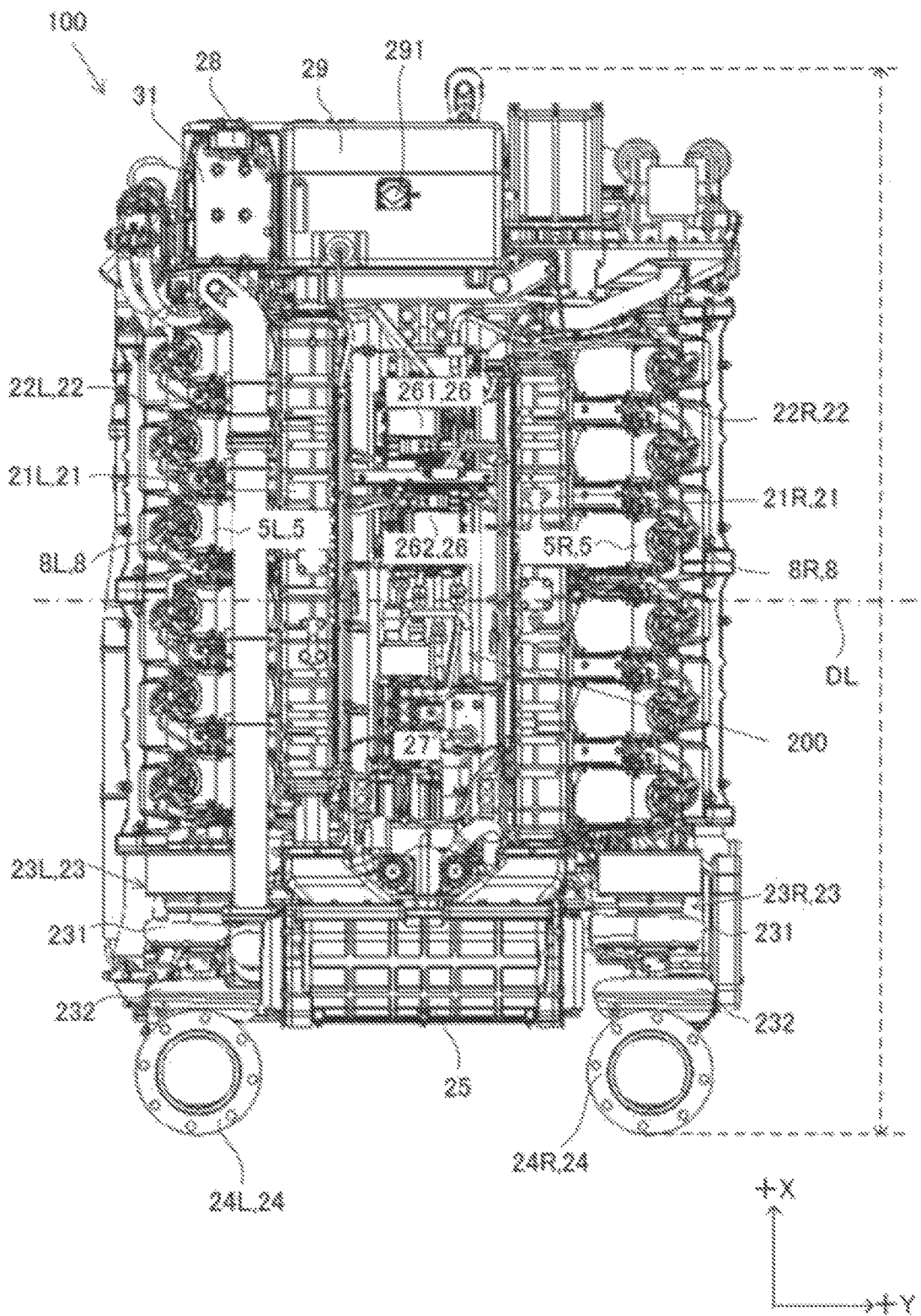
FIG. 4 is a schematic top view showing the configuration of the engine.

FIG. 4 is a schematic top view showing the configuration of the engine 100 according to the embodiment of the present invention. In FIG. 4, the upper face cover 9 and the pair of lateral face cover are omitted. As shown in FIGS. 1 and 4, the engine 100 includes an intake manifold 21 and an exhaust manifold 22.

To each of the cylinders 11, the intake manifold 21 distributes intake air which is air or mixture air taken in from the outside. The intake manifold 21 is placed at an upper portion of the engine 100, and extends in the front and back direction. In detail, the intake manifold 21 includes a right intake manifold 21R for the right cylinder 11R, and a left intake manifold 21L for the left cylinder 11L.

The right intake manifold 21R is placed above the respective intake ports 41 (see FIG. 2) of the plural right head blocks 4R which are arranged in the front and back direction. The interior of the right intake manifold 21R and the respective right cylinders 11R are connected via the respective intake ports 41. The left intake manifold 21L is placed above the respective intake ports 41 of the plural left head blocks 4L which are arranged in the front and back direction. The interior of the left intake manifold 21L and the respective left cylinders 11L are connected via the respective intake ports 41.

In detail, an intake valve (not shown) is interposed between each intake port 41 and each cylinder 11; when the intake valve is open, the inside of intake manifold 21 and cylinder 11 are communicated.

The exhaust manifold 22 collects the exhaust air from the respective cylinders 11. The exhaust manifold 22 is placed at the lateral face portion of the engine 100, and extends in the front and back direction. In detail, the exhaust manifold 22 includes a right exhaust manifold 22R for the right cylinder 11R, and a left exhaust manifold 22L for the left cylinder 11L.

The right exhaust manifold 22R is placed on the right side of the plural right head blocks 4R (see FIG. 2) which are arranged in the front and back direction. The inside of the right exhaust manifold 22R and the respective right cylinders 11R are connected via exhaust ports (not shown) provided on the right side of the right head blocks 4R. The left exhaust manifold 22L is placed on the left side of the plural left head blocks 4L (see FIG. 2) which are arranged in the front and back direction. The inside of the left exhaust manifold 22L and the respective left cylinders 11L are connected via the exhaust ports (not shown) provided on the left side of the left head blocks 4L.

In detail, an exhaust valve (not shown) is interposed between each exhaust port and each cylinder 11; when the exhaust valve is open, the inside of the exhaust manifold 22 and the cylinder 11 are communicated.

The exhaust gas collected at the right exhaust manifold 22R is exhausted to the outside via the right turbocharger 23R and the right exhaust outlet pipe 24R which are each placed at the right back of the engine 100. The exhaust gas collected at the left exhaust manifold 22L is exhausted to the outside via the left turbocharger 23L and the left exhaust outlet pipe 24L which are each placed at the left back of the engine 100.

The right turbocharger 23R and the left turbocharger 23L each have a compressor unit 231 and a turbine unit 232. The compressor unit 231 pressurizes and compresses intake air such as air supplied from outside the engine 100. The pressurized and compressed intake air is supplied via an intercooler 25 to the intake manifold 21. The turbine unit 232 is rotated by the exhaust gas supplied from the exhaust manifold 22. The rotary power of the turbine unit 232 is transmitted to the compressor unit 231. That is, the right turbocharger 23R and left turbocharger 23L in the present embodiment are so-called turbochargers that are driven by an exhaust gas turbine.

The intercooler 25, which is connected with the intake manifold 21, is supplied with cooling water by a cooling water pump (not shown), thereby to cool the intake air. The intake air supplied from the compressor unit 231 is pressurized and compressed, thereby to generate a compression heat and to be increased in temperature. The intercooler 25 performs heat exchange between the cooling water, which is supplied by the cooling water pump, and the pressurized compressed intake air, thereby to cool the intake air. That is, providing the intercooler 25 allows the temperature of the intake air, which is supplied to the intake manifold 21, to be adjusted to a desired temperature.

As shown in FIG. 4, the right intake manifold 21R and the left intake manifold 21L are spaced apart and arranged in the right and left direction at the upper portion of the engine 100. As shown in FIG. 4, with the upper face cover 9 removed, the intra-bank area 200 is exposed to the outside via a space between the right intake manifold 21R and the left intake manifold 21L. In the intra-bank area 200, there are placed, for example, the controller 26, which controls the entire engine 100, and a fuel pump 27 that supplies the fuel to the injector 8.

That is, the engine 100 includes the controller 26 placed in the intra-bank area 200 positioned between the first and second cylinder rows 111R and 111L. Also, the engine 100 includes the fuel pump 27 placed in the intra-bank area 200. The intra-bank area 200 may be, in a strict sense, a space area between the first and second cylinder rows 111R and 111L. However, in the present embodiment, the intra-bank area 200 widely includes the space area in the right and left direction between the right bank RB which includes the first cylinder row 111R, and the left bank LB which includes the second cylinder row 111L.

Creating the configuration to place the controller 26 and fuel pump 27 in the intra-bank area 200 can efficiently use the intra-bank area 200 for placing the component part. This makes it possible to downsize the engine 100. However, the controller 26 and the fuel pump 27 may be placed outside of the intra-bank area 200.

Further, the controller 26 includes, in detail, a first controller 261 and a second controller 262. However, the number of controllers 26 may be changed as needed; for example, the controller 26 may include only one controller. In the present embodiment, the first controller 261 and the second controller 262 are arranged in the front and back direction (crankshaft direction). In detail, the first controller 261 is placed forward of the second controller 262. One of the first controller 261 and the second controller 262 is a main controller and another thereof is a sub-controller. In the present embodiment, the first controller 261 is the main controller, and the second controller 262 is the sub-controller.

The first controller 261 configured as the main controller executes a calculation necessary to control the engine 100. The calculations required to control the engine 100 include, for example, a calculation related to the control of fuel injection and a calculation related to stopping the engine 100. The second controller 262 which is configured as the sub-controller is connected with the first controller 261 by a communication line (not shown), and is so provided as to be capable of communicating with the first controller 261. The second controller 262 executes a control operation according to an instruction from the first controller 261.

The first controller 261 controls the right injector 8R placed at the right bank RB. That is, the first controller 261 and each right injector 8R are electrically connected. Further, the second controller 262 controls the left injector 8L placed at the left bank LB. That is, the second controller 262 and each left injector 8L are electrically connected.

Further, the fuel pump 27 discharges the fuel, which is at a high pressure, toward a high pressure fuel pipe (not shown) for the right bank RB and a high pressure fuel pipe (not shown) for the left bank LB. The fuel passing through the high-pressure fuel pipe for the right bank RB is distributed to each of the right injectors 8R placed at the right bank RB. The fuel passing through the high-pressure fuel pipe for the left bank LB is distributed to each of the left injectors 8L placed at the left bank LB. Under control by the controller 26, each of the injectors 8 injects the fuel to the combustion chamber.

<2. Engine Stop Switch>

Figure 5:
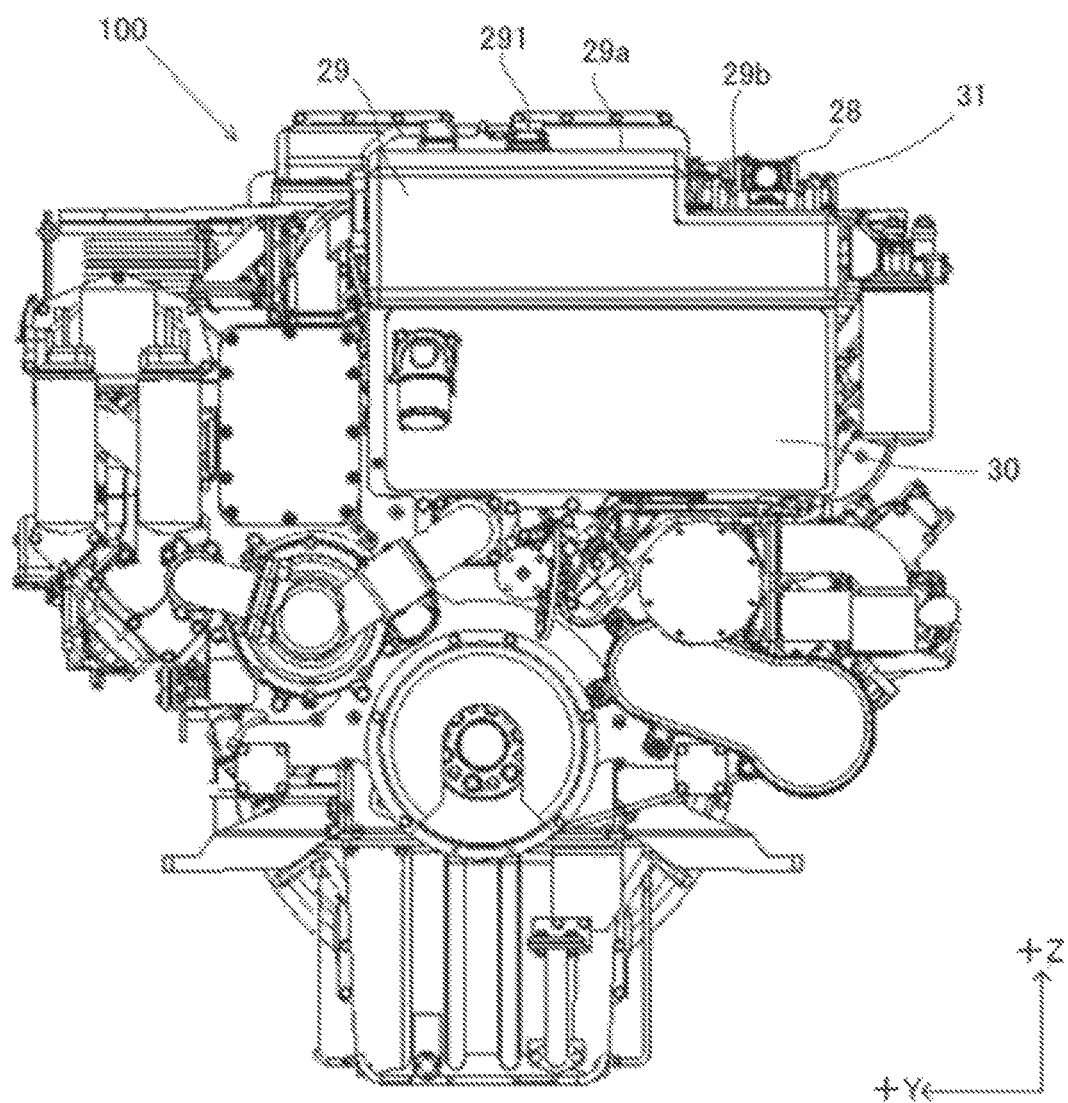
FIG. 5 is a schematic front view showing the configuration of the engine.

FIG. 5 is a schematic front view showing the configuration of the engine 100 according to the embodiment of the present invention. FIG. 5 shows the engine 100 viewed from the front toward the back. As shown in FIG. 5, the engine 100 is equipped with an engine stop switch 28 to stop the engine 100. In detail, the engine stop switch 28 is a switch for emergency stop of the engine 100. The engine stop switch 28 is electrically connected with the controller 26. Operating the engine stop switch 28 sends, to the controller 26, a signal showing that the operation has been executed. Upon receipt of the signal, the controller 26 executes a process to stop the engine 100. This stops the engine 100.

For example, when the engine 100 is configured as a marine engine, the emergency stop switch to emergently stop the engine 100 is placed, for example, on a bridge or on a control panel in the engine chamber. That is, the engine 100 is normally stopped by a remote operation. However, a situation could arise where the remote operation becomes impossible or where a person such as sailor is near the engine 100 and the distance to the emergency stop switch for remote operation is too large. As in the present embodiment, the engine 100 itself is provided with the engine stop switch 28 that enables the emergency stop, so that even in the case where the remote operation is impossible or in the case where the person such as sailor is near the engine 100 and needs to immediately stop the engine 100, the person such as sailor can urgently stop the engine 100 by pressing the engine stop switch 28.

In detail, as shown in FIGS. 4 and 5, the engine stop switch 28 is placed at the front end portion of the engine 100. As shown in FIGS. 1 and 4, the above right exhaust outlet pipe 24R and left exhaust outlet pipe 24L are placed at the back end portion of the engine 100. That is, the engine 100 is equipped with an exhaust outlet pipe 24 that is placed on one end side in the crankshaft direction and exhausts the exhaust gas. The engine 100 is equipped with the engine stop switch 28 placed at another end side in the crankshaft direction. The engine stop switch 28 is placed on the other end side in the crankshaft direction.

In the above constitution, the engine stop switch 28 can be placed at the engine 100's side opposite to the side where the hot exhaust gas is exhausted. This can suppress the engine stop switch 28 from being damaged by heat. Further, this can more reliably prevents the person, at the time of operating the engine stop switch 28, from accidentally touching a hot portion.

As shown in FIGS. 1 and 4, the above right turbocharger 23R and left turbocharger 23L are placed at the back end portion of the engine 100. That is, a turbocharger 23 connected with the exhaust outlet pipe 24 is placed on the one end side in the crankshaft direction. The engine stop switch 28 is placed in the position away from the turbocharger 23 which is prone to be a high temperature. As shown in FIG. 1, the above flywheel 2 is placed at the back end portion of the engine 100. That is, the engine 100 is equipped with the flywheel 2 placed on the one end side in the crankshaft direction. The engine stop switch 28 is placed opposite the flywheel 2.

In the ship, for example, a plurality of propulsion machines is provided, as the case may be. In the above case, plural engines are arranged in the right and left direction. Since the space in the engine chamber is limited, the space between the adjacent engines tends to be narrow. Creating a configuration where the engine stop switch is provided on the lateral face of the engine causes a concern that the adjacent engine will be in the way, making it difficult for the person such as sailor to approach the engine stop switch. Is this respect, the engine stop switch 28 is provided on the front side, rather than on the lateral face, of the engine 100. This allows the person such as sailor to easily approach the engine stop switch 28 provided at the engine 100.

In FIG. 4, a single-dotted line DL shows the engine 100's center portion in the front and back direction (crankshaft direction). As shown in FIG. 4, in the front and back direction of the engine 100, the controller 26 is placed on the front end side with respect to at the center portion. That is, the engine 100 is equipped with the controller 26 that is placed on the other end side in the crankshaft direction with respect to at the center portion in the crankshaft direction. As described above, the engine stop switch 28 is placed on the other end side in the crankshaft direction. This allows the controller 26, which is electrically connected to the engine stop switch 28, to be placed near the engine stop switch 28, making it easier to wire an electric wire. The controller 26 can be placed away from the turbocharger 23 and the exhaust outlet pipe 24 which are placed on the one end side in the crankshaft direction, making it possible to prevent the controller 26 from being damaged by heat.

In the present embodiment, the controller 26 is placed in the intra-bank area 200; however, the controller 26 may be placed in any other place. The controller 26 may be placed, for example, on the upper face, left or right lateral face of the engine 100.

The engine 100 is equipped with a cooling part included in a holding portion or passage of a cooling liquid. The engine stop switch 28 is placed at the cooling part or at a peripheral part of the cooling part. Creating the configuration where the engine stop switch 28 is placed at the cooling part or at the peripheral part thereof makes it possible to place the engine stop switch 28 in a position that is less susceptible to heat. The peripheral part may include a part fixed to the cooling part.

The cooling liquid may be, for example, water, a liquid made by adding an additive to water, a glycol-based liquid such as ethylene glycol, or a liquid made by adding an additive to a glycol-based solvent. The cooling part may be, for example, a tank for tanking the cooling water, a cooling pipe for flowing the cooling water, or a cooler such as the above intercooler 25. The peripheral part is, for example, a part that is mounted to, in contact with, or placed in the vicinity of the cooling part.

In the present embodiment, as shown in FIG. 5, etc., the engine 100 is equipped with a cooling water tank 29 that tanks the cooling water. The cooling water tank 29 is placed in the upper portion of the front end of the engine 100. The upper face of the cooling water tank 29 is provided with a water injecting unit 291 for injecting water into the tank. The water injecting unit 291 includes a water injecting port. The cooling water tank 29 is placed at the end portion on the engine 100's side opposite the side where the flywheel 2 is provided. This allows a worker to easily perform water-injecting work without being disturbed by an object such as clutch or propulsion machine, for example.

In the present embodiment, a fresh water cooler 30 is placed below the cooling water tank 29. The fresh water cooler 30 is used in combination with a thermostat (not shown), thereby to keep the fresh water (cooling water)'s temperature constant. In the fresh water cooler 30, heat exchange takes place between the fresh water and seawater, thereby to cool the fresh water. The thermostat, according to the temperature of the fresh water, switches the water channel and controls the flowrate, thereby to keep the fresh water's temperature constant. The thermostat is cased in a thermostat case 31 shown in FIG. 5. The fresh water cooler 30 may be included in the above cooling part.

In the present embodiment, the cooling part in which the engine stop switch 28 is placed or around which the engine stop switch 28 is placed is the cooling water tank 29 which tanks the cooling water.

The engine stop switch 28 is preferably placed at or near the upper face of the cooling water tank 29. In the present embodiment, the cooling water tank 29 is placed in the upper portion of the front face of the engine 100. By being provided at or near the upper face of the cooling water tank 29, the engine stop switch 28 can be placed in a position close to the sight line of the person such as sailor. That is, the engine stop switch 28 can be placed in the position where the person such as sailor easily operates the engine stop switch 28.

In detail, the cooling water tank 29 has a first upper face 29a, and a second upper face 29b that is lower than the first upper face 29a. The engine stop switch 28 is placed at the second upper face 29b, or at the peripheral part provided at the second upper face 29b. In the present embodiment, the first upper face 29a and the second upper face 29b are arranged in the right and left direction. In detail, the second upper face 29b is positioned on the left side of the first upper face 29a.

In the present embodiment, the first upper face 29a is provided with the water injecting unit 291 for injecting the cooling water. The engine stop switch 28 provided at the second upper face 29b is placed away from the water injecting unit 291.

The second upper face 29b is smaller in area than the first upper face 29a. That is, the engine stop switch 28 is provided at the second upper face 29b which is lower in height and smaller in area than the first upper face 29a.

Figure 6:
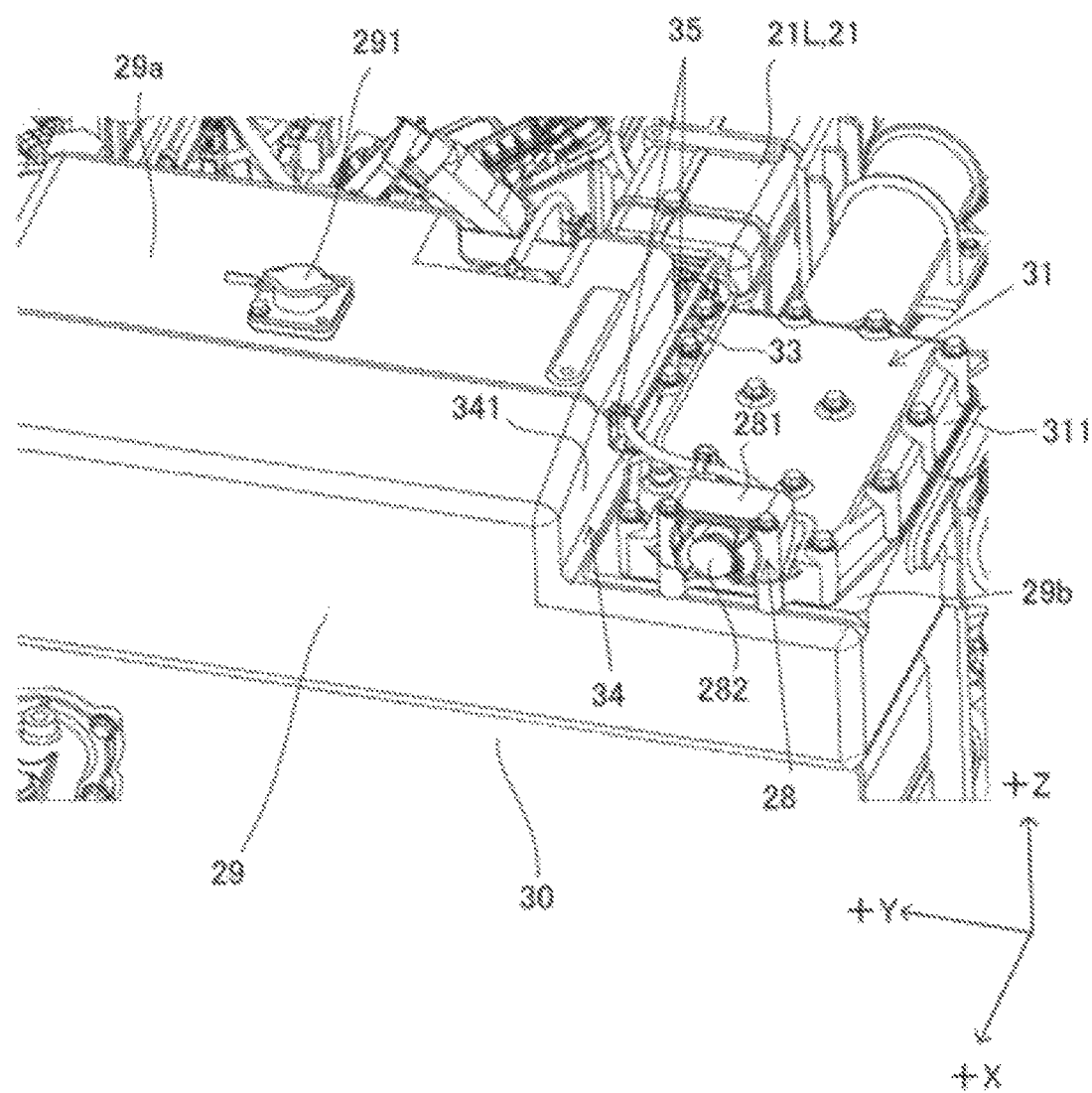
FIG. 6 is a schematic perspective view enlarging and showing an area around the engine's portion where an engine stop switch is placed.

FIG. 6 is a schematic perspective view enlarging and showing an area around the engine 100's portion where the engine stop switch 28 is placed. As shown in FIG. 6, the thermostat case 31 in which the thermostat (not shown) is cased is placed at the second upper face 29b of the cooling water tank 29. The engine stop switch 28 is placed at the thermostat case 31.

That is, the engine stop switch 28 is placed at the peripheral part that is placed at the second upper face 29b and that is of the cooling part. The above peripheral part is the thermostat case 31 for casing the thermostat.

In detail, the thermostat case 31 includes a portion of the cooling water tank 29, and a thermostat cover 311 that is fixed to the above portion by using a screw 32. Due to this, in detail, the engine stop switch 28 is placed at the thermostat cover 311. Due to this, the thermostat cover 311 may be interpreted as the peripheral part of the cooling part. The engine stop switch 28 is placed at the upper front end portion of the thermostat cover 311. The engine stop switch 28, together with the thermostat cover 311, is fixed to the cooling water tank 29 by the screw 32.

The engine stop switch 28 is placed at the upper face of the thermostat cover 311; thus, in the right and left direction, between the upper face where the engine stop switch 28 is placed and the first upper face 29a where the water injecting unit 291 is placed creates such a configuration as to place a groove. This can reduce a possibility that any water spilled due to the water-injecting work or the like should adhere to the engine stop switch 28.

The engine stop switch 28 has, in detail, a switch case portion 281 in which a circuit board (not shown) is cased and a button portion 282 that is so supported to the switch case portion 281 in a manner to be movable in the front and back direction. The circuit board cased in the switch case portion 281 is connected with the controller 26 by an electric wire 33. The switch case portion 281 is fixed to the thermostat cover 311. The person such as sailor, by pressing the button portion 282 toward the back, sends, to the controller 26, a signal showing that the engine stop switch 28 has been operated.

As shown in FIG. 6, the cooling water tank 29 has a boundary portion 34 positioned between the first and second upper faces 29a and 29b. The electric wire 33 connected to the engine stop switch 28 is placed at the boundary portion 34.

In detail, the boundary portion 34 includes a connecting face 341 that connects the first upper face 29a with the second upper face 29b. The connecting face 341 includes a plane parallel to the up and down direction. In a state of being supported to an electric wire support fixture 35 fixed to the connecting face 341, the electric wire 33 is placed at the boundary portion 34. As a preferred form, the electric wire support fixture 35 is fixed to a face parallel to the up and down direction of the connecting face 341. The electric wire 33 is placed along the connecting face 341, and is placed lower than the first upper face 29a. Creating the above configuration reduces the possibility that the worker and the like performing a maintenance on the engine 100 should step on or get caught by the electric wire 33.

<3. Notes, etc.>

The various technical features disclosed in the present specification can be modified in various ways without departing from the gist of the technical creation thereof. That is, the above embodiments should be considered exemplary in all respects and not restrictive. Further, the plural embodiments and modified examples shown in the present specification may be combined to the extent possible.

In the above embodiments, the engine 100 is the V-type engine, but this is merely an exemplification. The present invention can be applied, for example, to an in-line engine in which the pistons reciprocate in the up and down direction and a horizontally opposed engine in which the pistons reciprocate in the horizontal direction. Further, although the engine stop switch has been described by exemplifying the emergency stop switch that emergently stops the engine, the present invention can also be applied to a normal engine stop switch that stops the engine in a normal situation.

REFERENCE SIGNS LIST

2: flywheel
6: crankshaft
23: turbocharger
24: exhaust outlet pipe
26: controller
28: engine stop switch
29: cooling water tank (cooling part)
29a: first upper face
29b: second upper face
31: thermostat case (peripheral part)
33: electric wire
34: boundary portion
100: engine
291: water injecting unit
311: thermostat cover (peripheral part)

The invention claimed is:

1. An engine comprising:
an engine stop switch configured to stop the engine; and
a cooling tank configured to collect a cooling liquid,
wherein the engine stop switch is positioned at the cooling tank or at a peripheral part of the cooling tank.

2. The engine as claimed in claim 1, wherein the cooling tank is a cooling water tank configured to collect cooling water.

3. The engine as claimed in claim 1, wherein:
the cooling tank includes:
a first upper face, and
a second upper face that is lower than the first upper face, and
the engine stop switch is positioned at the second upper face, or at the peripheral part provided at the second upper face.

4. The engine as claimed in claim 3, wherein the second upper face is smaller in area than the first upper face.

5. The engine as claimed in claim 3, wherein:
the cooling tank has a boundary portion positioned at a boundary between the first upper face and the second upper face, and
an electric wire connected to the engine stop switch is positioned at the boundary portion.

6. The engine as claimed in claim 3, wherein the first upper face is provided with a water injecting unit configured to inject cooling water.

7. The engine as claimed in claim 1, wherein the peripheral part is a part fixed to the cooling tank, or a thermostat case casing a thermostat.

8. The engine as claimed in claim 1, further comprising:
an exhaust outlet pipe that is positioned at a first end of the engine and is configured to exhaust an exhaust gas, and
wherein the engine stop switch is positioned at a second end of the engine that opposes the first end in a crankshaft direction.

9. The engine as claimed in claim 8, wherein a turbocharger connected with the exhaust outlet pipe is positioned at the first end.

10. The engine as claimed in claim 1, comprising:
a flywheel positioned at a first end of the engine, and
wherein the engine stop switch is positioned at a second end of the engine that opposes the first end in a crankshaft direction.

11. The engine as claimed in claim 1, wherein the engine stop switch is positioned at a first end of the engine, the engine further comprising:
a flywheel positioned at a second end of the engine that opposes the first end in a crankshaft direction; and
a controller positioned between the first end and a center point between the first and second ends.

12. The engine as claimed in claim 1, wherein the cooling liquid is one of a liquid made by adding an additive to water, a glycol-based liquid, or a liquid made by adding an additive to a glycol-based solvent.

13. An engine comprising:
an exhaust outlet pipe that is positioned at a first end of the engine and is configured to exhaust an exhaust gas; and
an engine stop switch positioned at a second end of the engine that opposes the first end in a crankshaft direction.

14. The engine as claimed in claim 13, wherein the crankshaft direction extends along an axis of a crankshaft of the engine.

15. The engine as claimed in claim 13, further comprising a turbocharger positioned at the first end of the engine.

16. An engine comprising:
a flywheel positioned at a first end of the engine;
an engine stop switch positioned at a second end of the engine that opposes the first end in a crankshaft direction; and
a controller positioned between the second end and a center point between the first and second ends.

17. The engine as claimed in claim 16, wherein the crankshaft direction extends along an axis of a crankshaft of the engine.

18. The engine as claimed in claim 16, wherein the controller is positioned between a first row of cylinders of the engine and a second row of cylinders of the engine.

* * * * *